United States Patent

Kelly et al.

[11] Patent Number: 6,131,286
[45] Date of Patent: Oct. 17, 2000

[54] METHOD FOR SECURING A FIRST FABRICATION ELEMENT TO A SECOND FABRICATION ELEMENT DURING A WELDING OPERATION

[75] Inventors: Gordon W. Kelly, Delavan; Robert E. Klimko, Peoria; Charles F. Sieck, Dunlap; Richard H. Wetherill, Peoria, all of Ill.

[73] Assignee: Caterpillar Inc., Peoria, Ill.

[21] Appl. No.: 09/398,328

[22] Filed: Sep. 17, 1999

Related U.S. Application Data

[63] Continuation-in-part of application No. 08/710,601, Sep. 20, 1996, abandoned.

[51] Int. Cl.[7] .................................................. B21D 53/88
[52] U.S. Cl. .............................. 29/897.2; 29/505; 29/513
[58] Field of Search .................................... 29/897.2, 513, 29/505, 437, 468; 228/135, 136, 101, 49.1, 49.4; 403/242, 274, 230; 428/571, 582

[56] References Cited

U.S. PATENT DOCUMENTS

| | | | |
|---|---|---|---|
| 2,164,634 | 7/1939 | Barrett | 29/513 |
| 2,722,625 | 11/1955 | Bingeman et al. | 29/513 |
| 2,996,790 | 8/1961 | Trafford | 29/513 |
| 3,050,160 | 8/1962 | Chesser | 29/513 |
| 4,076,165 | 2/1978 | Latasiewicz et al. | 228/136 |
| 5,221,585 | 6/1993 | Kresse, Jr. et al. | 428/582 |
| 5,770,320 | 6/1998 | Hughes et al. | 403/274 |

*Primary Examiner*—Peter Vo
*Assistant Examiner*—Jim Calve
*Attorney, Agent, or Firm*—Maginot, Addison & Moore; Jeffrey L. Myers

[57] ABSTRACT

The fabrication assembly includes a first fabrication element having a slot defined therein and a second fabrication element having a locking mechanism secured thereto. The locking mechanism has (1) an alignment member, and (2) a twist tab connected to the alignment member. The locking mechanism cooperates with the slot to lock the first fabrication element to the second fabrication element. A method of attaching a first fabrication element to a second fabrication element is also disclosed.

7 Claims, 7 Drawing Sheets

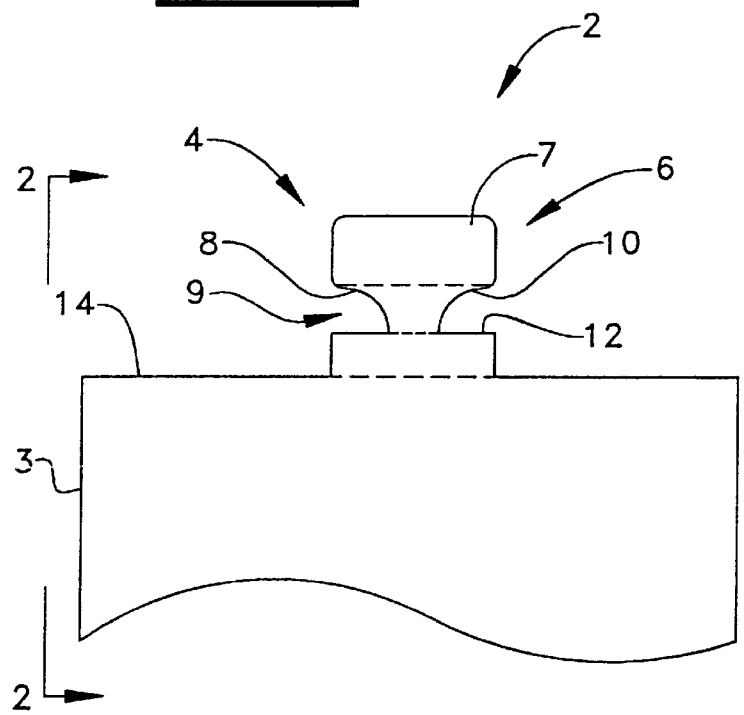
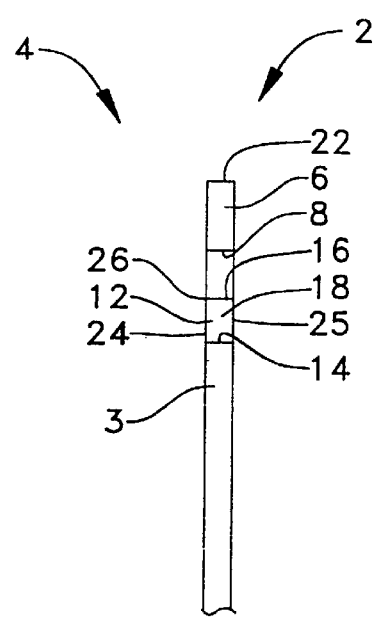
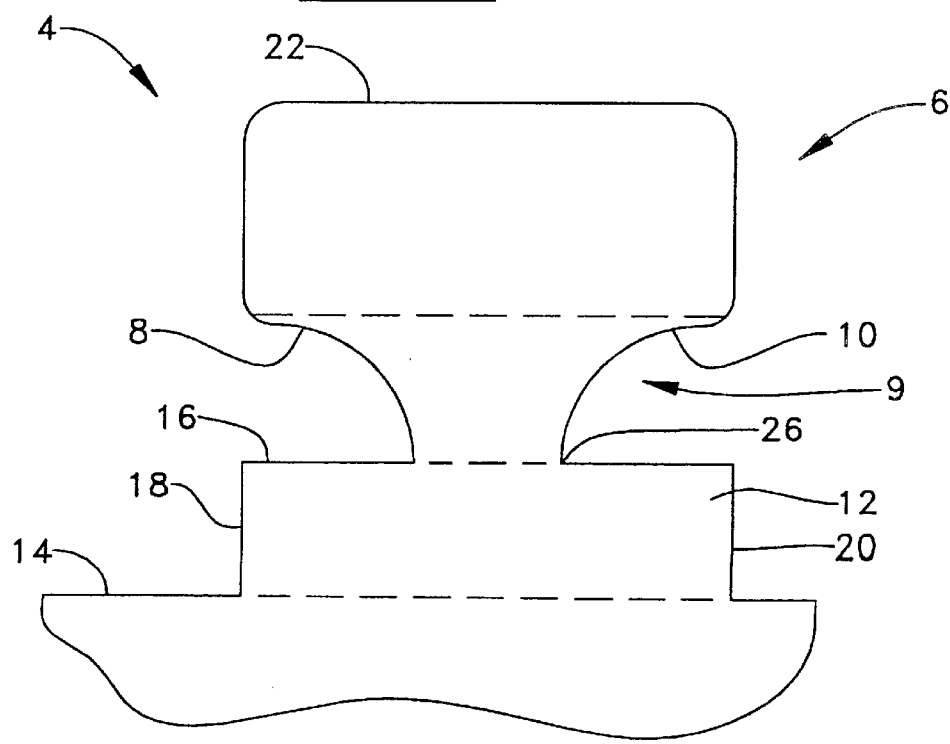

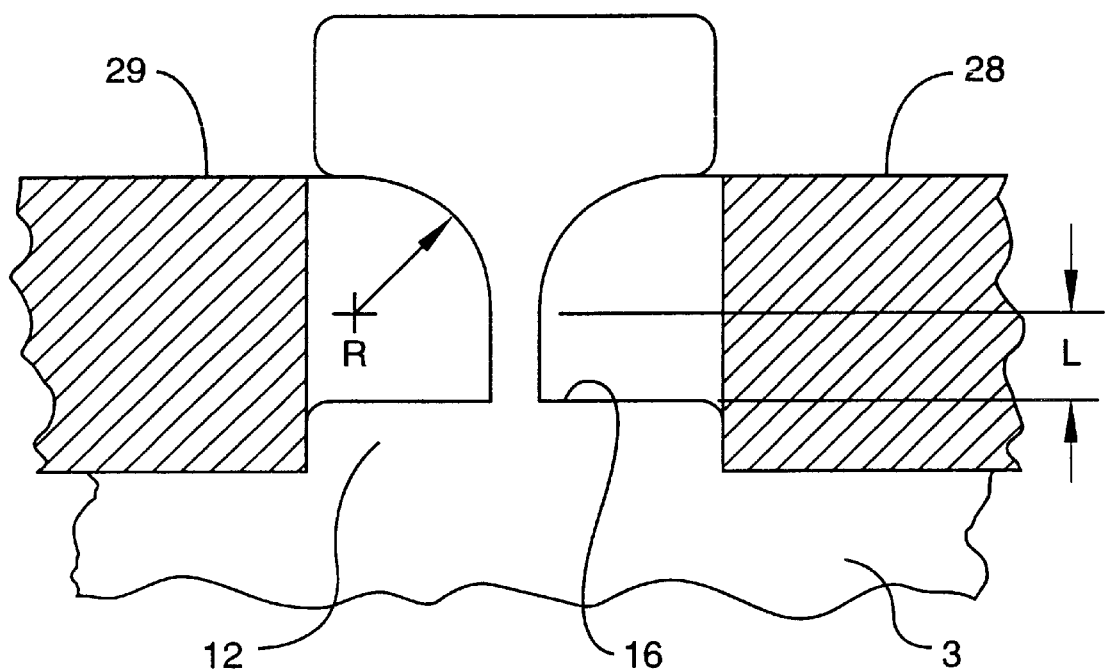
Fig_1b_

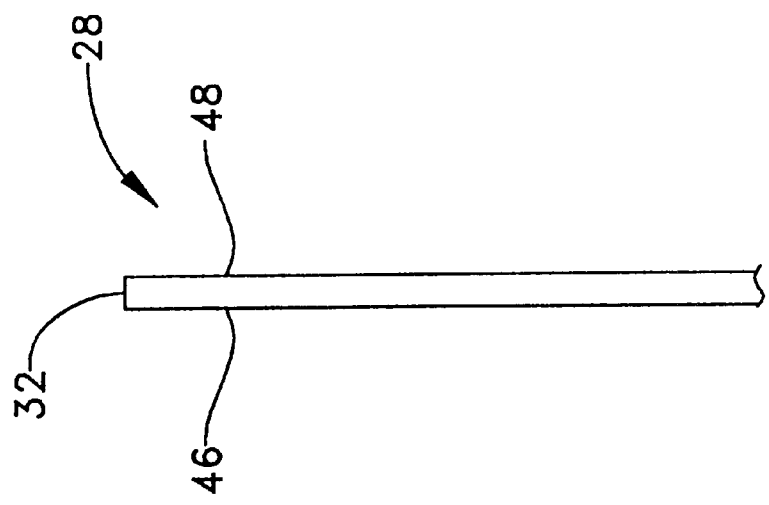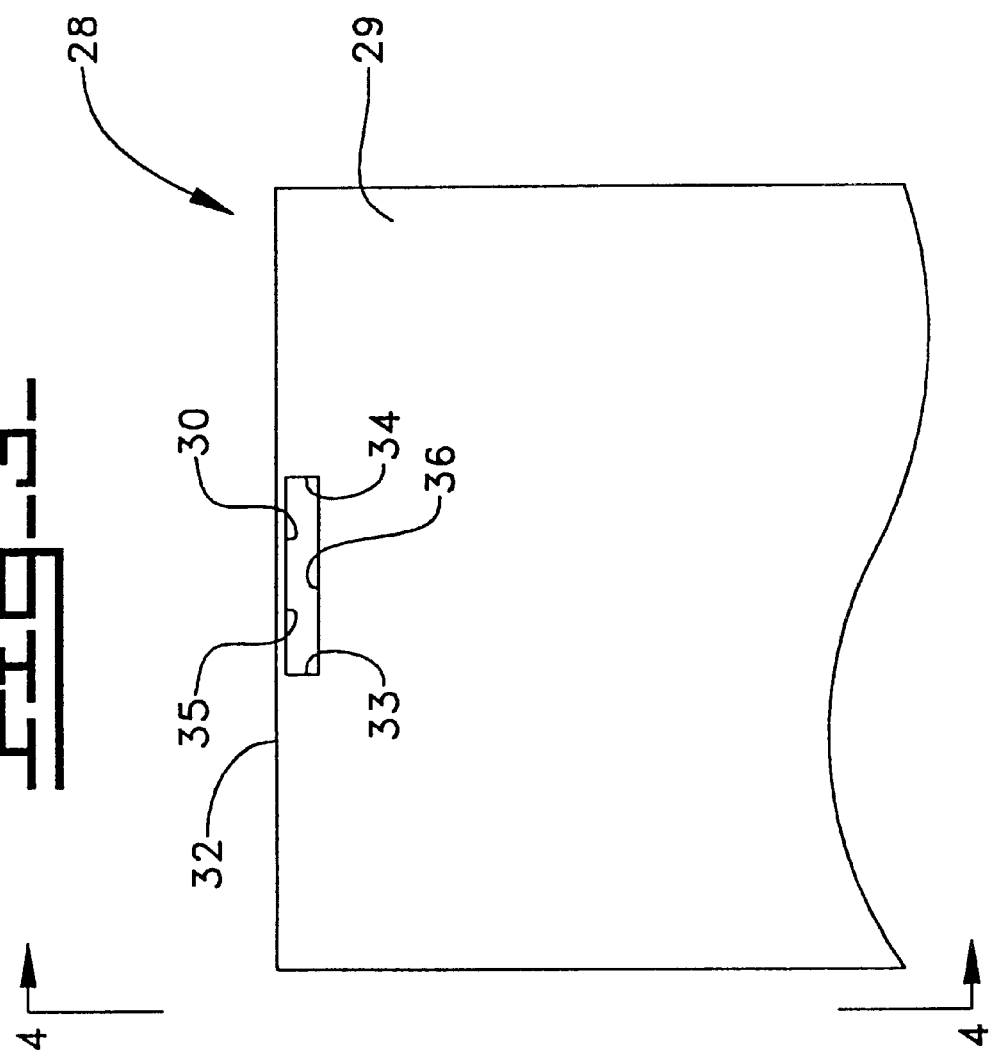

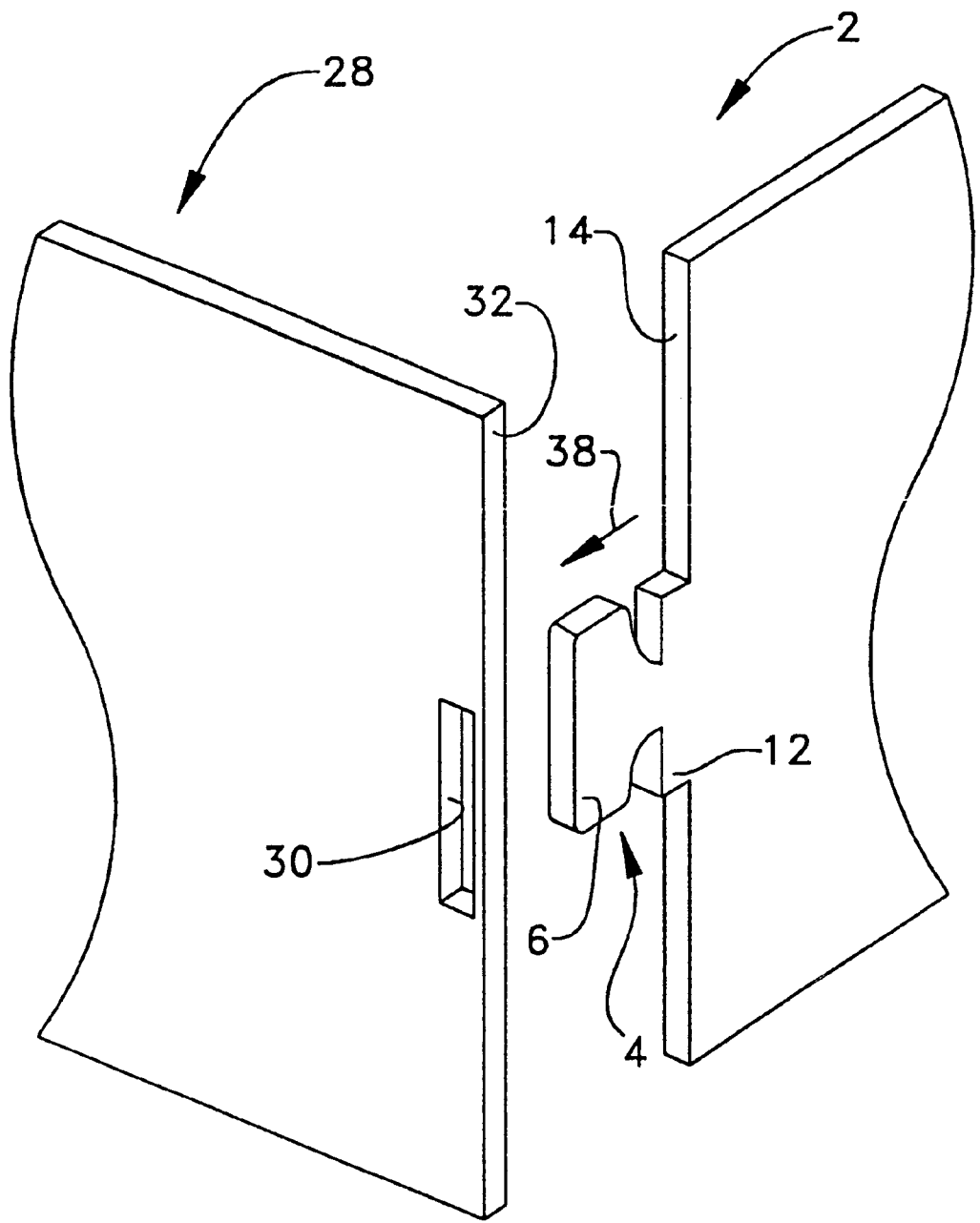

Fig_6_
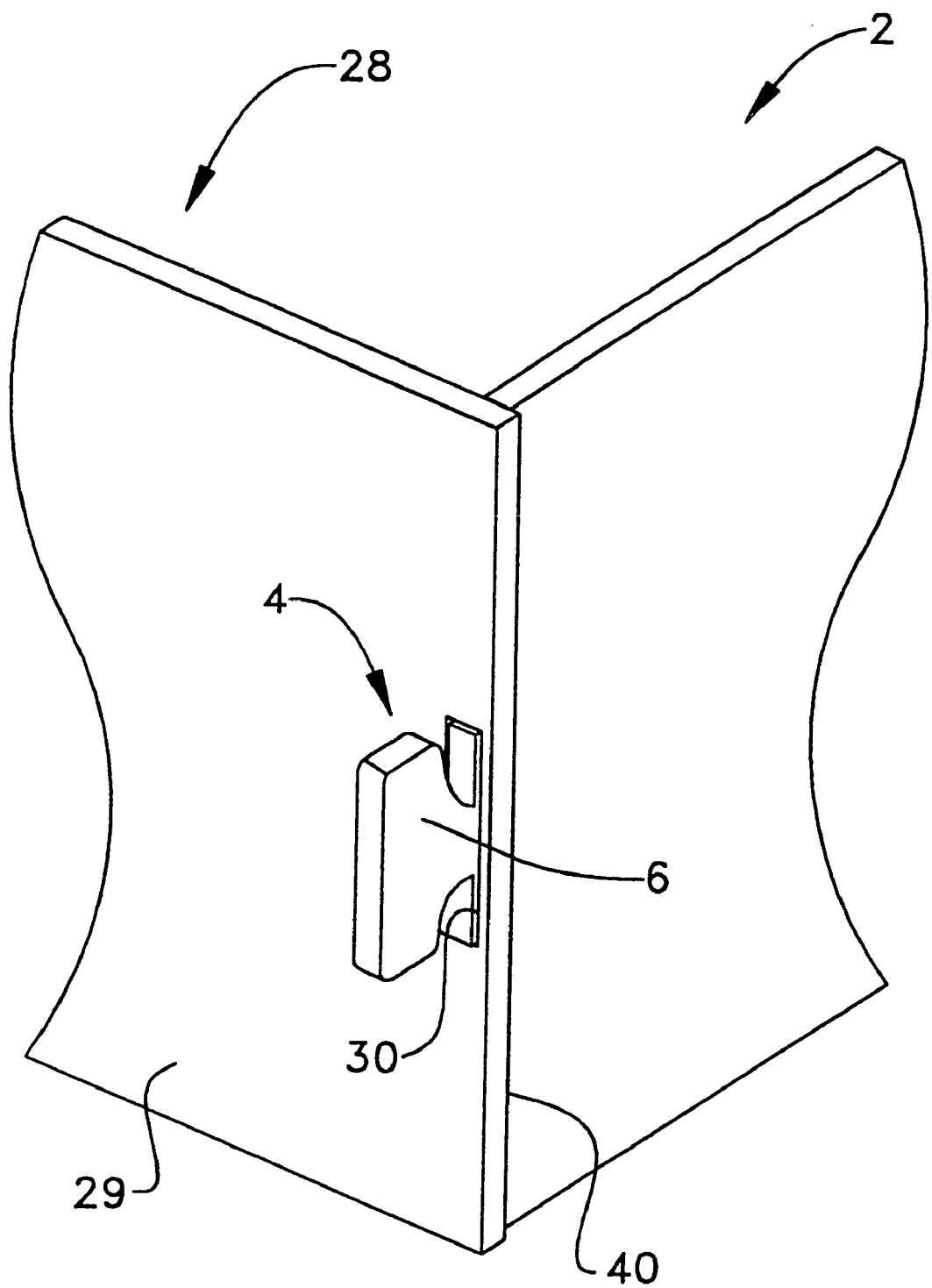

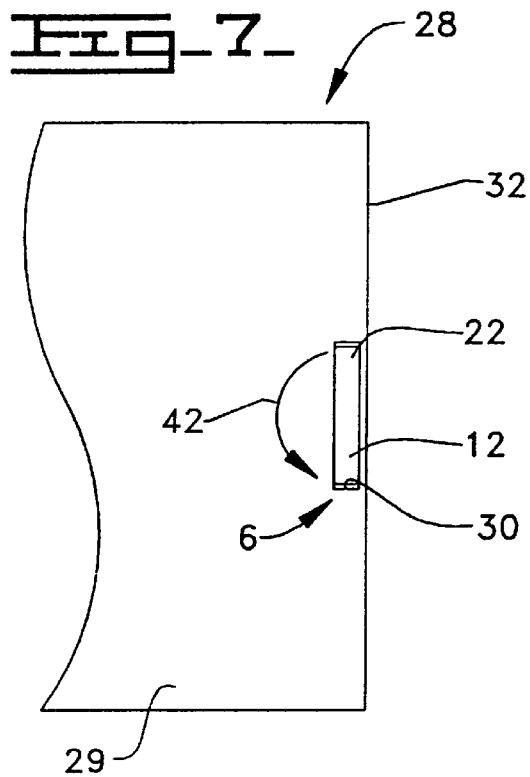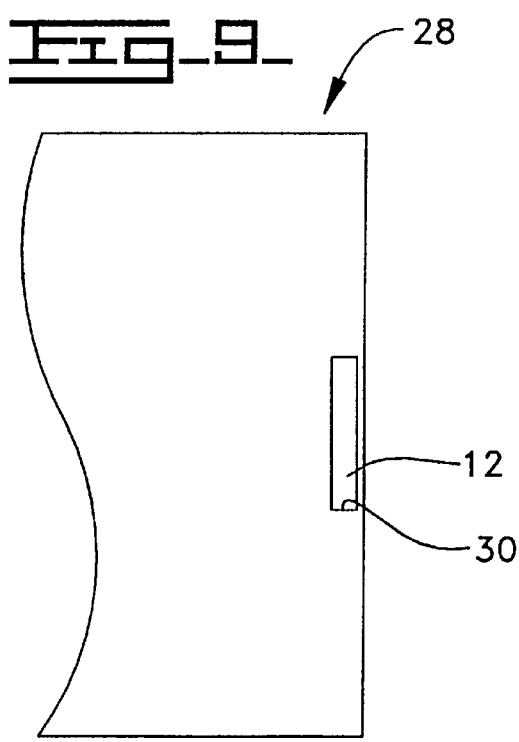

METHOD FOR SECURING A FIRST FABRICATION ELEMENT TO A SECOND FABRICATION ELEMENT DURING A WELDING OPERATION

This application is a continuation-in-part of application Ser. No. 08/710,601 filed Sep. 20, 1996, abnd.

TECHNICAL FIELD

The present invention relates generally to an apparatus and method for securing a first fabrication element to a second fabrication element, and more particularly to an apparatus and method for securing a first fabrication element to a second fabrication element such that the first and second fabrication elements can be more conveniently and accurately welded together.

Fabrication of various articles, such as vehicle frames, typically requires a number of fabrication elements (e.g. metal plates) to be welded together. In order to weld these fabrication elements together, they must be located and held in a proper orientation relative to one another during the welding operation.

The proper orientation of fabrication elements during a welding operation has heretofore depended upon the use of various holding devices, such as jigs or fixtures. However, these devices have the disadvantage of being mechanically complex, and therefore expensive to manufacture. Moreover, these jigs and fixtures possess many parts and thus are difficult to use during the welding process. All of the above disadvantages increase the time and cost to construct a fabricated article.

It would therefore be desirable to provide an apparatus and method that allows fabrication elements to be quickly and accurately secured to one another. It would further be desirable to provide an apparatus and method for securing fabrication elements which is inexpensive. It would also be desirable to provide an apparatus and method that reduces the misalignment of fabrication elements. Additionally, it would be desirable to provide an apparatus for securing fabrication elements which (1) is less mechanically complex, (2) has a small number of parts, (3) allows non-planar fabrication elements to be secured together and (4) is easy to use during the welding process.

SUMMARY OF THE INVENTION

In accordance with one embodiment of the present invention a fabrication assembly is provided. The fabrication assembly includes a first fabrication element having a slot defined therein and a second fabrication element having a locking mechanism secured thereto. The locking mechanism has (1) an alignment member, and (2) a twist tab connected to the alignment member. The locking mechanism cooperates with the slot to lock the first fabrication element to the second fabrication element.

In accordance with another embodiment of the present invention there is provided a method of attaching a first fabrication element to a second fabrication element. The method includes the steps of providing a first fabrication element having a slot defined therein. Providing a second fabrication element having a locking mechanism secured thereto, wherein the locking mechanism has (1) an alignment member, and (2) a twist tab connected to the alignment member. Inserting the alignment member and twist tab into the slot so that (1) the alignment member is positioned within the slot, and (2) the twist tab extends out of the slot. Rotating the twist tab relative to the alignment member so as to cause the first fabrication element to be locked to the second fabrication element.

In accordance with yet another embodiment of the present invention there is provided a method of attaching a first fabrication element to a second fabrication element, with the first fabrication element having a slot defined therein, and with the second fabrication element having a locking mechanism secured thereto, and further with the locking mechanism having an alignment member and a twist tab connected to the alignment member. The method includes the steps of inserting the alignment member and twist tab into the slot so that (1) the alignment member is positioned within the slot, and (2) the twist tab extends out of the slot. Rotating the twist tab relative to the alignment member so as to lock the first fabrication element to the second fabrication element. Welding the first fabrication element to the second fabrication element while the first fabrication element and the second fabrication element are locked together. Further rotating the twist tab relative to the alignment member until the twist tab is severed from the alignment member.

It is therefore an object of this invention to provide a new and useful apparatus and method for securing a first fabrication element to a second fabrication element during a welding operation.

It is a further object of this invention to provide an improved apparatus and method for securing a first fabrication element to a second fabrication element during a welding operation.

It is another object of this invention to provide an apparatus and method that quickly and precisely secures and aligns a first fabrication element to a second fabrication element during a welding operation.

It is still another object of this invention to provide an apparatus for securing a first fabrication element to a second fabrication element that is easy to use during the welding process.

It is yet another object of this invention to provide an apparatus, and method for securing a first fabrication element to a second fabrication element during a welding operation that is relatively inexpensive.

It is still another object of this invention to provide an apparatus for securing a first fabrication element to a second fabrication element during a welding operation that is less mechanically complex.

It is yet another object of this invention to provide an apparatus for securing a first fabrication element to a second fabrication element during a welding operation that has a small number of moving parts.

It is still another object of this invention to provide an apparatus and method for securing a first fabrication element to a second fabrication element during a welding operation that reduces misalignment of the first fabrication element relative to the second fabrication element.

It is yet another object of this invention to provide an apparatus and method that allows non-planar fabrication elements to be accurately secured together.

The above and other objects, features, and advantages of the present invention will become apparent from the following description and the attached drawings.

BRIEF DESCRIPTION OF THE DRAWINGS

FIG. 1 is a fragmentary front elevational view of a first fabrication element having a locking mechanism which incorporates the features of the present invention therein;

FIG. 1A is an enlarged view of the locking mechanism of FIG. 1;

FIG. 1B is an enlarged view of a locking arrangement similar to that of FIG. 1A showing a preferred embodiment;

FIG. 2 is a fragmentary view of the first fabrication element taken along line 2—2 of FIG. 1;

FIG. 3 is a fragmentary front elevational view of a second fabrication element having a slot which incorporates the features of the present invention therein;

FIG. 4 is a view of the second fabrication element taken along line 4—4 of FIG. 3;

FIG. 5 is a fragmentary perspective view of the first fabrication element and the second fabrication element positioned prior to the locking mechanism entering the slot;

FIG. 6 is a fragmentary perspective view of the first fabrication element and the second fabrication element, with the locking mechanism positioned within the slot;

FIG. 7 is a fragmentary front elevational view of the second fabrication element, with the twist tab of the locking mechanism located in a first position;

FIG. 8 is a fragmentary front elevational view of the second fabrication element, with the twist tab of the locking mechanism located in a second position;

FIG. 9 is a fragmentary front elevational view of the second fabrication element, with the twist tab shown detached from the alignment member;

DETAILED DESCRIPTION OF THE PREFERRED EMBODIMENT

Figure 10:
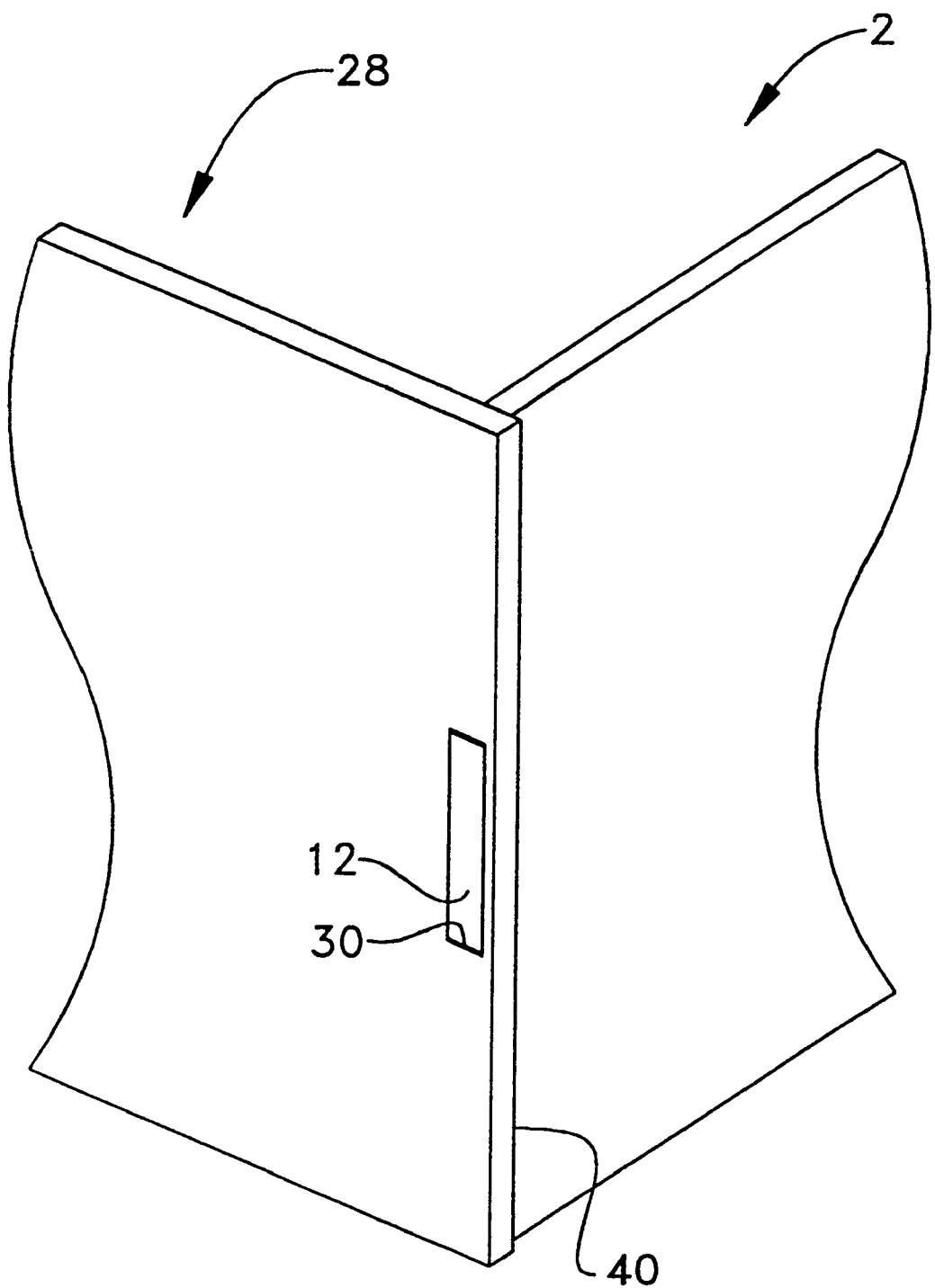
FIG. 10 is a fragmentary perspective view of the first fabrication element and the second fabrication element, with the twist tab shown detached from the alignment member.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIGS. 1, 1A and 2, there is shown a first fabrication element 2, which incorporates the features of the present invention therein. Referring also to FIGS. 3 and 4, there is shown a second fabrication element 28, which incorporates the features of the present invention therein. First fabrication element 2 and second fabrication element 28 can be made from any appropriate material utilized as sheet stock to construct a fabricated structure. For example, first fabrication element 2 and second fabrication element 28 can be made from a metal, and used to construct a vehicle frame.

First fabrication element 2 includes a plate portion 3 which defines an edge 14. Extending from edge 14 is a locking mechanism 4. Locking mechanism 4 includes a twist tab 6 and an alignment member 12. The alignment member 12 and the twist tab 6 are integrally formed together with the first fabrication element 2. Twist tab 6 includes a grip portion 7 and a tapered portion 9. Tapered portion 9 includes a first cam surface 8 and a second cam surface 10. Second fabrication element 28 includes a plate portion 29 which defines an edge 32. Second fabrication element 28 also includes a slot 30 defined therein near the edge 32.

The locking mechanism 4 of first fabrication element 2 is adapted to fit into, and cooperate with, slot 30 of second fabrication element 28. The cooperation between locking mechanism 4 and slot 30 allows first fabrication element 2 to be precisely secured to second fabrication apparatus 28 during a welding operation.

Preferably, well known laser cutting equipment is utilized to cut and form locking mechanism 4 on edge 14 of first fabrication element 2. Well known laser cutting equipment is also used to cut and form slot 30 of second fabrication element 28. The use of laser cutting equipment allows locking mechanism 4 and slot 30 to be cut and formed relatively quickly. Moreover, the use of laser cutting equipment allows locking mechanism 4 and slot 30 to be cut and formed with precise tolerances.

As shown in FIG. 1A, locking mechanism 4 includes an alignment member 12 and a twist tab 6 extending from a top surface 16 of alignment member 12. The height of alignment member 12 is defined by the distance between edge 14 and top surface 16. The length of alignment member 12 is defined by the distance between a first side 18 and a second side 20. The width of alignment member 12 is defined by the distance between a third side 24 and a fourth side 25.

As discussed above, second fabrication element 28 (see FIG. 3) includes slot 30 defined therein near edge 32. As shown in FIG. 3, the length slot 30 is defined by the distance between an end wall 33 and an end wall 34. The width of slot 30 is defined by the distance between a side wall 35 and a side wall 36.

The height of alignment member 12 is less than the thickness of second fabrication element 28. As shown in FIG. 4, the thickness of the second fabrication element 28 is defined by the distance between a first surface 46 and a second surface 48.

The length and width of alignment member 12 and slot 30, must be precisely cut so that alignment member 12 will snugly fit into slot 30 and engage end wall 33, end wall 34, side wall 35 and side wall 36. For example, the length and width of alignment member 12 and slot 30 are preferably cut with tolerances in the range of +/−0.1 mm. Tight tolerances of alignment member 12 and slot 30 are necessary because once alignment member 12 is inserted into slot 30 the engagement between alignment member 12 and end walls 33, 34 and side walls 35, 36 of slot 30 functions to help fix the physical orientation between first fabrication element 2 and second fabrication element 28. Moreover, the engagement between alignment member 12 and end walls 33, 34 and side walls 35, 36 of slot 30 functions to accurately locate twist tab 6 relative to slot 30.

As shown in FIGS. 1, 1A and 2, twist tab 6 includes a first cam surface 8 and a second cam surface 10. First cam surface 8 and second cam surface 10 are cut (with known laser cutting equipment) to form tapered portion 9 of twist tab 6. Tapered portion 9 is interposed between, and connected to, alignment member 12 and grasp portion 7. Having first cam surface 8 and second cam surface 10 formed in such a manner allows twist tab 6 to be twisted from a first position as shown in FIG. 7 (see also FIG. 1) to a second position (or locked position) as shown in FIG. 8. Specifically, twist tab 6 is in the first position when a top surface 22 of the twist tab 6 is in a substantially parallel relationship with top surface 16 of alignment member 12. Twist tab 6 is in the second position when it is turned or twisted such that top surface 22 of the twist tab 6 is in a perpendicular relationship with top surface 16 of alignment member 12. FIG. 8 shows the twist tab 6 of fabrication element 2 protruding through slot 30 of second fabrication element 28. In FIG. 8, the position of twist tab 6 is shown after it has been rotated or twisted in the direction of arrow 44. The twisting of twist tab 6 positions the top surface 22 in a substantially perpendicular relationship with top surface 16 of alignment member 12.

First cam surface 8 and second cam surface 10 are preferably smooth curved surfaces, as opposed to surfaces having sharp angles. Having smooth curved surfaces facilitates the turning of twist tab 6 in slot 30 from the first position (see FIG. 7) to the second position (see FIG. 8). Once twist tab 6 is in the second position, first cam surface 8 and second cam surface 10 firmly engage the plate portion 29 of second fabrication element 28. Having first cam surface 8 firmly engaged with plate portion 29 ensures that first fabrication element 2 and second fabrication element 28 are securely held together.

As shown in FIG. 1A, tapered portion 9 is cut so as to form a tab fail area 26. Tab fail area 26 is the location where tapered portion 9 and top surface 16 are connected. The point where tapered portion 9 and top surface 16 intersect, preferably forms an approximate right angle. The right angle and tapered shape of tapered portion 9 creates a stress riser between the two members. This allows twist tab 6 to cleanly break away from alignment member 12 at tab fail area 26 when twist tab 6 is severely twisted relative to alignment member 12. It should be understood that the angular displacement required to cause a break at tab fail area 26 is significantly greater than the angular displacement required to move twist tab 6 from the first position to the second position.

An important dimension of tapered portion 9 is its twist clearance. The twist clearance is defined by the distance between first cam surface 8 (or second cam surface 10) of twist tab 6 and top surface 16 of alignment member 12. The combined length of the twist clearance and the height of alignment member 12 must be greater than or equal to the thickness of second fabrication element 28. Having the twist clearance length and the height of alignment member 12 designed in the aforementioned manner allows the twist tab 6 to rotate when inserted through slot 30. As previously discussed, rotating twist tab 6 while in slot 30 allows first cam surface 8 and second cam surface 10 to engage plate portion 29 of second fabrication element 28.

It should be understood that the height of alignment member 12 and the length of the twist clearance may each be adjusted to fit a specific application. However, the adjustment of the height of alignment member 12 and the length of the twist clearance is subject to the following limitations: (1) the height of alignment member 12 must be less than the thickness of second fabrication element 28 and (2) the sum of the height of alignment member 12 and the length of the twist clearance must be greater than or equal to the thickness of second fabrication element 28.

Turning now to the preferred embodiment disclosed in FIG. 1B, it can be seen that a stem portion is positioned between the top surface 16 of the alignment member 12 and the lower extremities of the first and second cam surfaces 8 and 10. In this embodiment the cam surfaces are shown as radii having a preselected length R. The length of the stem portion is indicated by L on FIG. 1B and is determined by the length of the radius minus the height of the alignment member. As is shown in the drawing, the length of the stem portion is sufficient to accommodate the thickness of the second fabrication element 28 in such a manner to position the upper plate portion 29 slightly beneath the upper extremity of the cam surfaces. In this embodiment the thickness of the stem portion increases the overall height of the tab and is reduced in cross-sectional area. This enables the tab to more readily shear off when desired.

Another important dimension of twist tab 6 is the grip height. The grip height is defined by the distance between second cam surface 10 and the top surface 22. The larger this distance, the more twist tab 6 protrudes through slot 30. The grip height needs to be large enough so that twist tab 6 can be gripped and twisted with a tool, such as a wrench.

Now referring to FIG. 5 there is shown the first fabrication element 2 and the second fabrication element 28 positioned prior to the locking mechanism 4 entering the slot 30 Specifically, first fabrication element 2 and second fabrication element 28 are positioned such that edge 14 and edge 32 both assume a vertical orientation. First fabrication element 2 and second fabrication element 28 are also positioned such that locking mechanism 4 is adjacent to slot 30. First fabrication element 2 is then moved in the direction indicated by arrow 38 until locking mechanism 4 enters slot 30. First fabrication element 2 is further moved in the direction indicated by arrow 38 until alignment member 12 is nested in slot 30 such that twist tab 6 protrudes therethrough as shown in FIG. 6. At this point, edge 14 is in contact with second fabrication element 28. It should be appreciated that having alignment member 12 nested in slot 30 precisely positions first fabrication element 2 relative to second fabrication element 28. In FIG. 6, the position of first fabrication element 2 relative to second fabrication element 28 forms a right angle. However, other geometric orientations are contemplated.

Referring again to FIG. 7, there is shown the second fabrication element 28 with the twist tab 6 shown protruding through the slot 30, and the twist tab 6 located in the first position. In operation, twist tab 6 is grasped with a tool, such as a wrench, and twisted in the direction indicated by arrow 42 to the second position as shown in FIG. 8. The twisting of twist tab 6 causes first cam surface 8 and second cam surface 10 (see FIG. 1) to engage plate portion 29 of second fabrication element 28. This engagement precisely locates and locks first fabrication element 2 relative to second fabrication element 28. Once locked in position, first fabrication element 2 and second fabrication element 28 are welded together along interface 40 (see FIG. 6).

Referring again to FIG. 8, there is shown the second fabrication element 28 with the twist tab 6 protruding through the slot 30 and located at its second position. Once the welding process is complete, twist tab 6 is further twisted in the direction indicated by arrow 44. This additional twisting causes twist tab 6 to break away from alignment member 12 at tab fail area 26 (see FIG. 1A) Thus, twist tab 6 is severed from first fabrication element 2. FIG. 9 is a view similar to FIG. 8 with twist tab 6 shown severed from alignment member 12.

Referring now to FIG. 10, the first fabrication element 2 and second fabrication element 28 is shown after welding and removal of twist tab 6. As shown in FIG. 10, first fabrication element 2 and second fabrication element 28 are welded together to form a right angle fabrication assembly. Slot 30, with alignment member 12 disposed therein, can be filled with an appropriate material to strengthen the right angle fabrication assembly and provide a smooth surface. Once slot 30 is filled, first fabrication element 2 and second fabrication element 28 can be used as a subassembly in the fabrication of an apparatus such as a vehicle.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected. For example, twist tab 6 is shown in FIG. 8 as being oriented perpendicular to alignment member 12 when in its second or locked position. However, other orientations of twist tab 6 relative to alignment member 12 are contemplated for the second or locked position (e.g. 45° angle). Additionally, twist tab 6 is shown being turned in a counterclockwise direction in FIGS. 7 and 8. It should be understood that twist tab 6 can also be turned in a clockwise direction to achieve the same function. It should also be understood that slot 30 and alignment member 12 can have geometric configurations other than rectangular. However, the geometric configuration of slot 30 and alignment member 12 should allow alignment member 12 to snugly fit into slot 30. It should also be appreciated that the disclosed apparatus and method can be utilized in fastening procedures other than a welding operation.

What is claimed is:

1. A method of attaching a second fabrication element to a first fabrication element, comprising the steps of:

providing a second fabrication element having a slot defined therein;

providing a first fabrication element having a locking mechanism secured thereto, wherein the locking mechanism has (1) an alignment member connected to the first fabrication element, and (2) a twist tab connected to the by a stem extending therebetween, and (3) a pair of radiused cam members defined on said alignment member;

inserting the alignment member and twist tab into the slot so that (1) the alignment member is positioned within the slot, and (2) the twist tab extends out of the slot; and rotating the twist tab relative to the alignment member so as to cause the radiused cam members to engage sidewalls of said slot of said second fabrication element and to thereby lock the second fabrication element to the first fabrication element.

2. The method of claim 1, further comprising the steps of:

welding the second fabrication element to the first fabrication element while the second fabrication element and the first fabrication element are locked together; and further rotating the twist tab relative to the alignment member so as to cause the twist tab to be severed from the alignment member.

3. The method of claim 1, wherein:

the slot of the second fabrication element has a second slot sidewall and a first slot sidewall, and the rotating step includes the step of rotating the twist tab so that (1) the second radiused cam surface contacts the second slot sidewall, and (2) the first radiused cam surface contacts the first slot sidewall.

4. The method of claim 1, wherein the alignment member and the twist tab are integrally formed together with the first fabrication element.

5. A method of attaching a second fabrication element to a first fabrication element, with the second fabrication element, comprising the steps of:

providing a second fabrication element having a slot defined therein;

providing a first fabrication element having a locking mechanism secured thereto, wherein the locking mechanism has (1) an stem, wherein said radiused cam members form smooth curved surfaces tapering inwardly along the stem from the twist tab to the alignment member, and (2) a twist tab having a stem portion, said twist tab being connected to the alignment member by the stem portion, which includes radiused cam members that form smooth curved surfaces tapering inwardly along the stem from the twist tab to the alignment member, in a manner wherein the stem portion and the alignment member form an approximate right angle with respect to one another;

inserting the alignment member and twist tab into the slot so that (1) the alignment member is positioned within the slot, and (2) the twist tab extends out of the slot;

rotating the twist tab relative to the alignment member so that said radiused cam members engage sidewalls of said slot so as to lock the second fabrication element to the first fabrication element;

welding the second fabrication element to the first fabrication element while the second fabrication element and the first fabrication element are locked together; and further rotating the twist tab relative to the alignment member until the twist tab is severed from the alignment member along with the stem portion thereof.

6. The method of claim 5, wherein:

the slot of the second fabrication element has a second slot sidewall and a first slot sidewall, the twist tab includes a second radiused cam surface and a first radiused cam surface, the rotating step includes the step of rotating the twist tab so that (1) the second radiused cam surface contacts the second slot sidewall, and (2) the first radiused cam surface to contact the first slot sidewall.

7. The method of claim 5, wherein the alignment member and the twist tab are integrally formed together with the first fabrication element.

* * * * *

UNITED STATES PATENT AND TRADEMARK OFFICE
CERTIFICATE OF CORRECTION

PATENT NO.    : 6,131,286
DATED         : October 17, 2000
INVENTOR(S)   : Gordon W. Kelly et al.

It is certified that error appears in the above-identified patent and that said Letters Patent is hereby corrected as shown below:

Column 7,
Line 28, please add -- alignment member -- after "the"
Lines 29, 30, delete "alignment member" and insert -- stem, wherein said radiused cam members form smooth curved surfaces tapering inwardly along the stem from the twist tab to the alignment member --

Delete entire claim and insert
-- 5.    A method of attaching a second fabrication element to a first fabrication element, with the second fabrication element, comprising the steps of:
    providing a second fabrication element having a slot defined therein;
    providing a first fabrication element having a locking mechanism secured thereto, wherein the locking mechanism has (1) an alignment member, and (2) a twist tab having a stem portion, said twist tab being connected to the alignment member by the stem portion, which includes radiused cam members that form smooth curved surfaces tapering inwardly along the stem from the twist tab to the alignment member in a manner wherein the stem portion and the alignment member form an approximate right angle with respect to one another; /
    inserting the alignment member and the twist tab into the slot so that (1) the alignment member is positioned within the slot, and (2) the twist tab extends out of the slot;
    rotating the twist tab relative to the alignment member so that said radiused cam members engage sidewalls of said slot so as to lock the second fabrication element to the first fabrication element;

UNITED STATES PATENT AND TRADEMARK OFFICE
CERTIFICATE OF CORRECTION

PATENT NO. : 6,131,286
DATED : October 17, 2000
INVENTOR(S) : Gordon W. Kelly et al.

It is certified that error appears in the above-identified patent and that said Letters Patent is hereby corrected as shown below:

welding the second fabrication element to the first fabrication element while the second fabrication element and the first fabrication element are locked together; and
   further rotating the twist tab relative to the alignment member until the twist tab is severed from the alignment member along with the stem portion thereof. --

Signed and Sealed this

Eighteenth Day of June, 2002

*Attest:*

JAMES E. ROGAN
*Director of the United States Patent and Trademark Office*

*Attesting Officer*